(12) United States Patent
Teshima et al.

(10) Patent No.: US 7,621,993 B2
(45) Date of Patent: Nov. 24, 2009

(54) METHOD FOR PRODUCING PIGMENT DISPERSION AND PIGMENT DISPERSION PRODUCING APPARATUS

(75) Inventors: Takayuki Teshima, Atsugi (JP); Shoji Ihara, Yokohama (JP); Kenji Yamada, Yokohama (JP); Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 11/260,893

(22) Filed: Oct. 27, 2005

(65) Prior Publication Data

US 2006/0090697 A1    May 4, 2006

(30) Foreign Application Priority Data

Oct. 29, 2004  (JP)  ............... 2004-316151

(51) Int. Cl.
*C09D 17/00*  (2006.01)
*C09D 11/00*  (2006.01)
*B05D 1/02*  (2006.01)

(52) U.S. Cl. .............. 106/400; 106/311; 106/493
(58) Field of Classification Search .............. 106/400, 106/311, 493
See application file for complete search history.

(56) References Cited

U.S. PATENT DOCUMENTS

| 2002/0040662 A1 | 4/2002 | Dietz et al. |
| 2006/0057485 A1 | 3/2006 | Teshima et al. |
| 2006/0060109 A1 | 3/2006 | Yamada et al. |

FOREIGN PATENT DOCUMENTS

| JP | 2001-172532 | 6/2001 |
| JP | 2004-33901 | 2/2004 |
| JP | 2004045654 A | * 2/2004 |
| JP | 2004144787 A | * 5/2004 |

* cited by examiner

*Primary Examiner*—Kelechi C Egwim
(74) *Attorney, Agent, or Firm*—Canon U.S.A., Inc., IP Division

(57) ABSTRACT

A method for producing a pigment dispersion, including the steps of: preparing a fluid in a supercritical or subcritical state in which a pigment is dissolved; and introducing into a microreactor the fluid in a supercritical or subcritical state in which the pigment is dissolved and a solution containing a dispersant for dispersing the pigment in a dispersing medium, precipitating the pigment in the microreactor, and dispersing the precipitated pigment in the dispersing medium using the dispersant.

11 Claims, 4 Drawing Sheets

METHOD FOR PRODUCING PIGMENT DISPERSION AND PIGMENT DISPERSION PRODUCING APPARATUS

BACKGROUND OF THE INVENTION

1. Field of the Invention

The present invention relates to a pigment dispersion, a method for producing the same, and a pigment dispersion producing apparatus.

2. Related Background Art

An inkjet recording method has major features such as compactness and low power consumption as a direct recording method. The image quality and the printing speed have been rapidly improved owing to a reduction in nozzle size and the like.

The inkjet recording method is a recording method in which an ink fed from an ink tank is discharged from a nozzle to form an image on a recording medium. Such methods include a method in which an ink is heated by a. heater in a nozzle and thereby vaporized and foamed to discharge the ink from the nozzle, and a method in which a piezo element is vibrated to discharge an ink from a nozzle.

A dye aqueous solution is normally used for an ink for use in the inkjet recording method, and therefore there are cases where bleeding occurs when colors are superposed, or a phenomenon called feathering emerges in the paper fiber direction at a position of recording on the recording medium.

For the purpose of improving the above situations, use of a pigment dispersion ink is under consideration. For example, an ink having a pigment stably dispersed using a polymer dispersant is disclosed in U.S. Pat. No. 5,085,698. The pigment dispersion ink has been found to have considerably improved light-resistance, water-resistance and fixation characteristics compared with the case where a dye is used. However, a pigment that is used in the ink is generally obtained through a step of mechanically pulverizing an agglomerate of a commercially available pigment using a dispersing apparatus such as a ball mill. Therefore, typically, the average particle diameter of the pigment after the pulverizing step is greater than about 100 nm (0.1 μm), and further the particle size distribution of even a pigment having a relatively large particle size distribution is in the range of 80 to 180 nm.

In U.S. Application Publication No. 2002-040662 is disclosed a method in which fluids discharged from nozzles are collided in a reactor chamber to produce a pigment dispersion. The publication discloses a method in which suspensions including a crude pigment, an agglomeration stabilizing liquid and a liquid medium are discharged from nozzles situated oppositely in the reactor chamber and mutually collided to pulverize and disperse the crude pigment at the same time.

However, even in this method, further improvements for stably obtaining a pigment dispersion having a very small particle diameter are desired.

Aside from this, there is a method disclosed in Japanese Patent Application Laid-Open No. 2004-33901 as a method for efficiently producing a metallic colloid solution having a small particle diameter. The publication discloses a method for producing a metallic colloid solution by reducing a metal compound under presence of a polymer pigment dispersant, wherein the reduction is carried out in a microreactor. According to the method disclosed in the publication, a metallic colloid having a small particle diameter can be produced efficiently, but production of a pigment dispersion having a very small particle diameter is not disclosed in the publication. Furthermore, particular control of a state of a fluid introduced into the microreactor is not disclosed.

Aside from this, there is a method disclosed in Japanese Patent Application Laid-Open No. 2001-172532 as a method for producing an aqueous ink. The publication discloses that a hydrophobic dye is dissolved in a supercritical fluid, and the resultant solution is atomized and mixed with water to obtain a dispersion. According to the publication, an ink having a dye uniformly dispersed can be obtained. However, the publication discloses neither production of a pigment dispersion having dispersed a pigment having a very small particle diameter nor use of a microreactor.

SUMMARY OF THE INVENTION

The present invention has been made in view of such background arts, and provides a method for producing a pigment dispersion having dispersed a pigment uniform in particle diameter and very small and being stable over a long period using a fluid in a supercritical state and a microreactor.

According to an aspect of the present invention, there is provided a method for producing a pigment dispersion, comprising the steps of:

preparing a fluid in a supercritical or subcritical state in which a pigment is dissolved; and introducing into a microreactor the fluid in a supercritical or subcritical state in which the pigment is dissolved and a solution containing a dispersant for dispersing the pigment in a dispersing medium to precipitate the pigment in the microreactor and to disperse the precipitated pigment in the dispersing medium using the dispersant.

A coolant is preferably introduced into the microreactor.

The fluid in a supercritical or subcritical state in which the pigment is dissolved is preferably brought into contact with the coolant in a channel comprising the microreactor, and then these fluids are preferably brought into contact with the solution containing the dispersant.

The pigment is preferably precipitated by the contact between the fluid in a supercritical or subcritical state in which the pigment is dissolved and the coolant, and the precipitated pigment is preferably brought into contact with the solution containing the dispersant.

In the method for producing a pigment dispersion, at an interface between the fluid in a supercritical or subcritical state in which the pigment is dissolved and the coolant, the fluid in a supercritical or subcritical state in which the pigment is dissolved is preferably diffused into the coolant to precipitate the pigment from the fluid in a supercritical or subcritical state in which the pigment is dissolved.

Alternatively, in the method for producing a pigment dispersion, the precipitated pigment is preferably dispersed in the solution containing the dispersant at an interface between the solution containing the dispersant and the coolant.

The fluid in a supercritical or subcritical state in which the pigment is dissolved, the coolant and the solution containing the dispersant, which come into contact in a channel comprising the microreactor, preferably form a laminar flow.

The microreactor preferably has a plurality of channels placed concentrically in such a manner as to surround a first channel, the fluid in a supercritical or subcritical state in which the pigment is dissolved is introduced from the first channel, the coolant is introduced from a channel provided to be adjacent to the first channel, and the solution containing the dispersant is introduced from an outer channel.

The coolant is preferably water.

The dispersant is preferably a block copolymer.

The block copolymer is preferably amphipathic.

According to another aspect of the present invention, there is provided a pigment dispersion producing apparatus comprising:

a microreactor having a plurality of fluid inlets for introducing a fluid at one end of a channel and an outlet for guiding out the fluid at the other end, wherein a first fluid inlet is formed substantially at the center of the channel and the fluid inlets are formed so as to in turn surround the periphery of the first fluid inlet and to nest the inlets;

a means for precipitating a pigment dissolved in a subcritical or supercritical fluid from the fluid in a supercritical or subcritical state introduced from the first fluid inlet and a solution introduced from a second fluid inlet coming in contact with the first fluid inlet and formed on the outer periphery of the first fluid inlet; and a means for dispersing the precipitated pigment in a dispersant solution introduced from a third fluid inlet coming in contact with the second fluid inlet and formed on the outer periphery of the second fluid inlet.

The diameter of the channel is preferably 10000 μm or less. The microreactor preferably has a cooling means.

According to the method of the present invention, a fluid in a supercritical or subcritical state in which a pigment is dissolved is introduced into a microreactor, whereby a large number of nuclei can be generated in a short time (in an instant), and thereby a dispersion having dispersed a pigment having a very small particle diameter can be obtained. Fluids can be made to contact in an orderly manner by using a microreactor, and the pigment is rendered uniform in particle diameter. Further, the pigment dispersion produced by the method of the present invention is a dispersion of a very small pigment uniform in particle diameter, and is therefore stable over a long period.

DETAILED DESCRIPTION OF THE PREFERRED EMBODIMENTS

It is known that in a region called a supercritical region, a medium is in an intermediate state which is neither a gas phase nor a liquid phase, and shows a unique nature physically and chemically. The supercritical state means a state in which the pressure is a critical pressure or greater and the temperature is a critical temperature or greater. The subcritical state means a state in which the temperature is a critical temperature or greater and the pressure is less than a critical pressure, or the temperature is less than a critical temperature and the pressure is a critical pressure or greater, namely the temperature or pressure does not reach a critical point by a slight amount. In the specification of this application, a fluid in the supercritical state will be called a supercritical fluid and a fluid in the subcritical state will be called a subcritical fluid in some cases below.

The present invention provides a method for producing a pigment dispersion using a supercritical fluid or subcritical fluid, and a production apparatus producing the pigment dispersion.

The method for producing a pigment dispersion provided by the present invention comprises the steps of:

preparing a fluid in a supercritical or subcritical state in which a pigment is dissolved; and introducing into a microreactor the fluid in a supercritical or subcritical state in which the pigment is dissolved and a solution containing a dispersant for dispersing the pigment in a dispersing medium to precipitate the pigment in the microreactor and to disperse the precipitated pigment in the dispersing medium using the dispersant.

In the present invention, a coolant may be further introduced into the microreactor.

In the present invention, the fluid in a supercritical or subcritical state in which a pigment is dissolved may be brought into contact with the coolant in a channel comprising the microreactor, followed by bringing the fluid and the coolant into contact with a solution containing the dispersant.

In the present invention, the pigment may be precipitated by contact between the fluid in a supercritical or subcritical state in which a pigment is dissolved and the coolant, and the precipitated pigment may be brought into contact with the solution containing the dispersant.

The fluid in a supercritical or subcritical state in which a pigment is dissolved may be diffused in the coolant at an interface between the fluid in a supercritical or subcritical state in which the pigment is dissolved and the coolant to precipitate the pigment from the fluid in a supercritical or subcritical state in which the pigment is dissolved.

The precipitated pigment may be dispersed in the solution containing the dispersant at an interface between the solution containing the dispersant and the coolant.

In the present invention, the fluid in a supercritical or subcritical state in which the pigment is dissolved, the coolant and the solution containing the dispersant, which come into contact in a channel comprising the microreactor, may form a laminar flow.

The microreactor may have a plurality of channels placed concentrically in such a manner as to surround the first channel, wherein the fluid in a supercritical or subcritical state in which the pigment is dissolved is introduced from the first channel, the coolant is introduced from a channel provided to be adjacent to the first channel, and further the solution containing the dispersant is introduced from an outside channel.

The pigment dispersion producing apparatus provided by the present invention comprises:

a microreactor having a plurality of fluid inlets for introducing a fluid at one end of a channel and an outlet for guiding out the fluid at the other end, wherein a first fluid inlet is formed substantially at the center of the channel and the fluid inlets are formed so as to in turn surround the periphery of the first fluid inlet and to nest the inlets;

a means for precipitating a pigment dissolved in a subcritical or supercritical fluid from the fluid in a supercritical or subcritical state introduced from the first fluid inlet and a solution introduced from a second fluid inlet coming in contact with the first fluid inlet and formed on the outer periphery of the first fluid inlet; and a means for dispersing the precipitated pigment in a dispersant solution introduced from a third fluid inlet coming in contact with the second fluid inlet and formed on the outer periphery of the second fluid inlet.

The microreactor which is used in the present invention is a chemical device making use of a phenomenon in a micro space in a small three-dimensional structure which is used for the reaction and mixing of fluids.

The microreactor is a generic term of reaction and mixing apparatuses having a plurality of micro-scale channels. For example, the microreactor is described in detail in "Microreactors New Technology for Modern Chemistry" (written by Wolfgang Ehrfeld, Volker Hessel, Holger Loewe, WILEY-VCH Co., Ltd., issued in 2000) and the like.

The present invention will be described below with reference to FIGS. 5, 6A and 6B.

Figure 5:
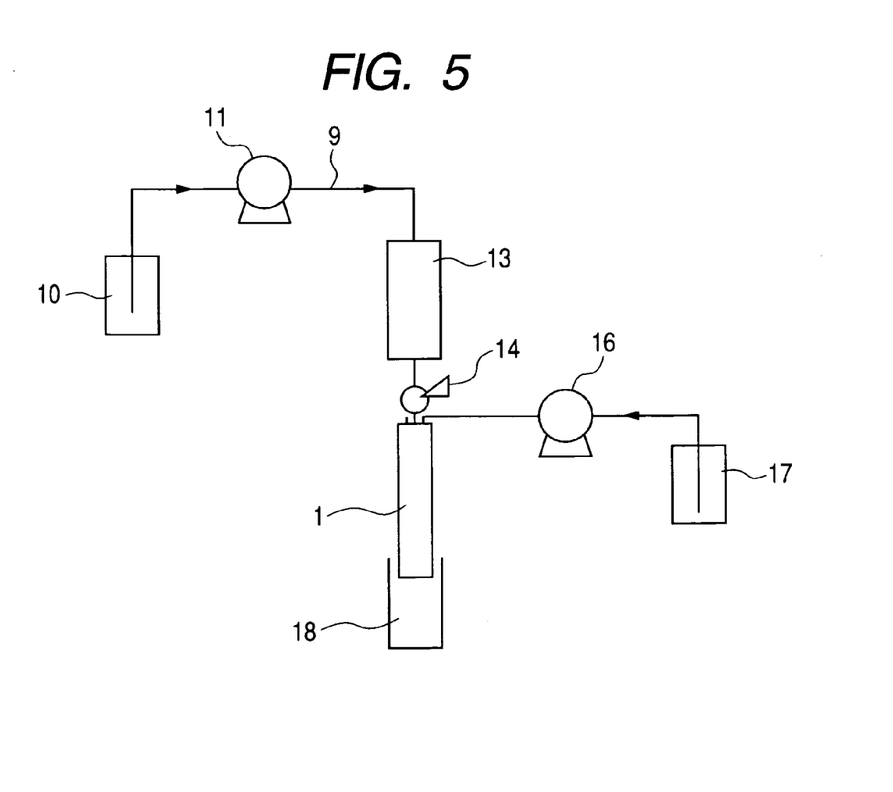
FIG. 5 is a schematic diagram showing one example of the pigment dispersion producing apparatus of the present invention.

FIG. 5 is a schematic diagram showing one example of the pigment dispersion producing apparatus of the present invention.

In FIG. 5, reference numeral 10 denotes a solvent tank containing a solvent dissolving a pigment, and reference numeral 11 denotes a high-pressure pump for feeding the solvent in the solvent tank 10 to a sub/supercritical reaction vessel 13 via a solvent feeding pipe 9. The solvent in the solvent tank 10 is preheated to a desired temperature by a preheating portion (not shown) installed between the high-pressure pump 11 and the sub/supercritical reaction vessel 13 when fed via the solvent feeding pipe 9. The pigment is preliminarily introduced in the sub/supercritical reaction vessel 13, the solvent fed from the solvent tank 10 is brought into a supercritical or subcritical state, and the pigment is dissolved. Here, a heating portion (not shown) is provided around the sub/supercritical reaction vessel 13, whereby a desired temperature corresponding to the subcritical or supercritical state can be obtained. The supercritical or subcritical fluid which is obtained in the sub/supercritical reaction vessel 13 and in which the pigment is dissolved is fed to a microreactor 1 via a pressure regulator 14. The pressure regulator 14 is used to convert the pressure of the sub/supercritical reaction vessel to which a high pressure is applied into a predetermined pressure. Reference numeral 17 denotes a dispersant solution tank containing a solution containing a dispersant for dispersing the pigment in a dispersing medium. For the dispersant for dispersing the pigment, the solvent in the solvent tank 10 may be used, and a medium dissolving the dispersant in the dispersant solution tank 17 may be used. The solution containing the dispersant in the dispersant solution tank 17 is fed to the microreactor 1 via a high-pressure pump 16, and comes into contact with the supercritical or subcritical fluid in which the pigment is dissolved in the microreactor 1. Reference numeral 18 denotes a collection device for collecting a dispersion obtained by the contact between the supercritical or subcritical fluid in which the pigment is dissolved and the solution containing the dispersant.

The apparatus shown in FIG. 5 is one example of what implements the present invention, and the present invention is not limited to the apparatus.

The behavior of the fluid in the microreactor 1 will be described below with reference to FIGS. 6A and 6B. FIG. 6A is a schematic sectional view showing one example of a microreactor applicable to the dispersion producing apparatus of the present invention, and FIG. 6B is a schematic sectional view cut along a plane perpendicular to the fluid travel direction. The microreactor 1 in FIG. 6A corresponds to the microreactor 1 shown in FIG. 5. The microreactor 1 shown in FIG. 6A has the second channel placed concentrically in such a manner as to surround the first channel. In FIGS. 6A and 6B, reference numeral 3 denotes a first fluid inlet, and a second fluid inlet 4 is provided to surround the first fluid inlet 3.

Figure 6A:
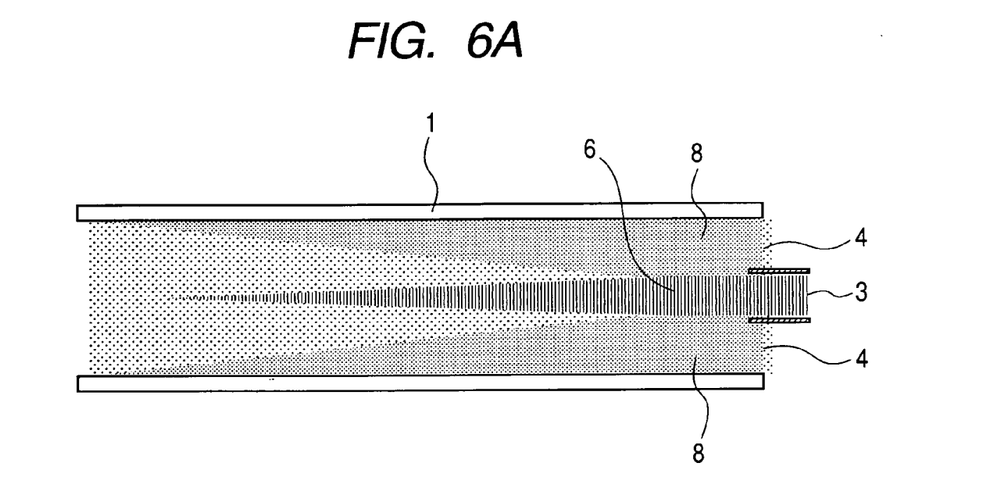
FIGS. 6A and 6B are schematic sectional views showing one example of the microreactor capable of being used in the present invention.
Figure 6B:
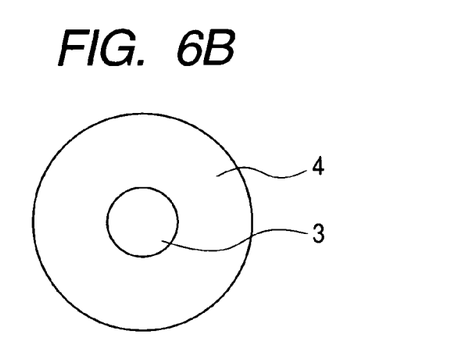

The fluid in the supercritical or subcritical state which is fed via the pressure regulator 14 from the sub/supercritical reaction vessel 13 of FIG. 5 and in which the pigment is dissolved is introduced to the microreactor 1 from the first fluid inlet in FIGS. 6A and 6B. Here, the amount of the subcritical or supercritical fluid in the sub/supercritical reaction vessel 13 fed into the microreactor is controlled by the pressure regulator 14. The dispersant solution in the dispersant solution tank 17 fed via the high-pressure pump 16 in FIG. 5 is introduced into the microreactor 1 from the second fluid inlet in FIGS. 6A and 6B.

A fluid 6 in the subcritical or supercritical state which is introduced from the first fluid inlet 3 and in which the pigment is dissolved comes into contact with a solution 8 introduced from the second fluid inlet 4 and containing the dispersant in the microreactor. The pigment which can no longer be dissolved is precipitated in the dispersing medium (solvent in the solvent tank 10 or medium dissolving the dispersant in the dispersant solution tank 17). The precipitated pigment is dispersed in the dispersing medium due to interaction with the dispersant, and a pigment dispersion having a pigment dispersed in the dispersing medium is obtained in the collection device 18 in FIG. 5.

In the microreactor 1 shown in FIGS. 6A and 6B described here, no cooling means is placed on the periphery of the concentric reactor 1, but cooling means may be provided for enhance the cooling efficiency, and the reactor may have the increased number of channels.

Figure 1A:
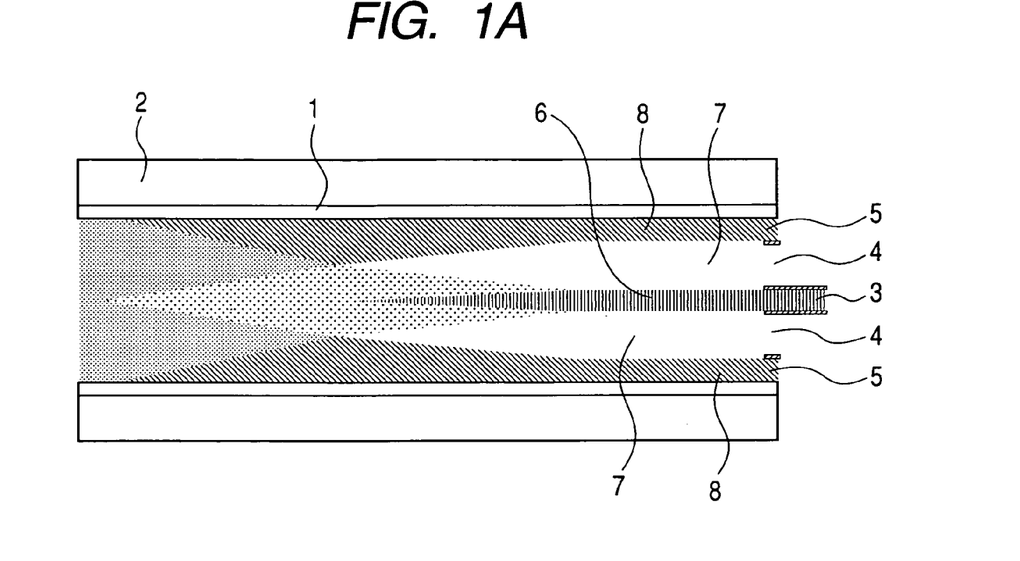
FIGS. 1A and 1B are schematic sectional views showing one example of a microreactor capable of being used in the present invention.
Figure 1B:
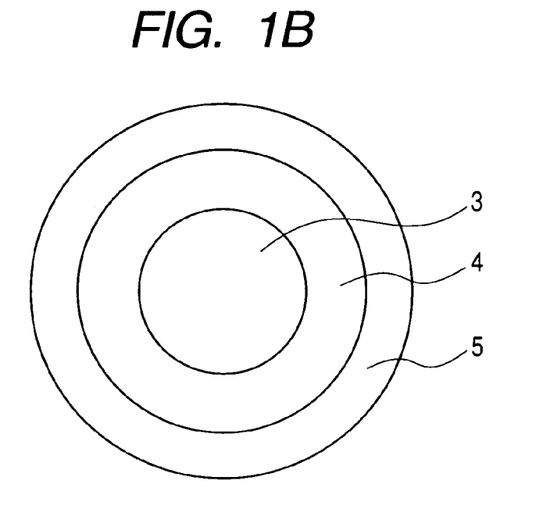

The dispersion producing apparatus using a microreactor having the increased number of channels, together with such cooling means, will be described using FIGS. 1A, 1B, 2 and 3. FIGS. 1A and 1B are schematic sectional views showing one example of the microreactor. The microreactor of FIGS. 1A and 1B is different from the reactor of FIGS. 6A and 6B described previously in that cooling means 2 is provided on the periphery of the channel and a third fluid inlet 5 is provided as a channel.

If the microreactor of FIGS. 1A and 1B is used, for example, production of the dispersion may be as follows.

Into the microreactor 1 cooled by the external cooling means 2, the subcritical or supercritical fluid 6 in which the pigment is dissolved is introduced from the first fluid inlet 3, the coolant 7 is introduced from the second fluid inlet 4, and the dispersant solution 8 is introduced from the third fluid inlet 5. In this way, a laminar flow is formed in the channel of the microreactor 1, and crystallization and dispersion occur on a step-by-step basis due to diffusion and movement between adjacent fluids.

Here, as shown in FIG. 1B, the fluid inlet is formed from the first fluid inlet 3 formed substantially at the center of the channel, the second fluid inlet 4 formed on the outer periphery of the first fluid inlet 3 and the third fluid inlet 5 formed on the outer periphery of the second fluid inlet 4.

Figure 2:
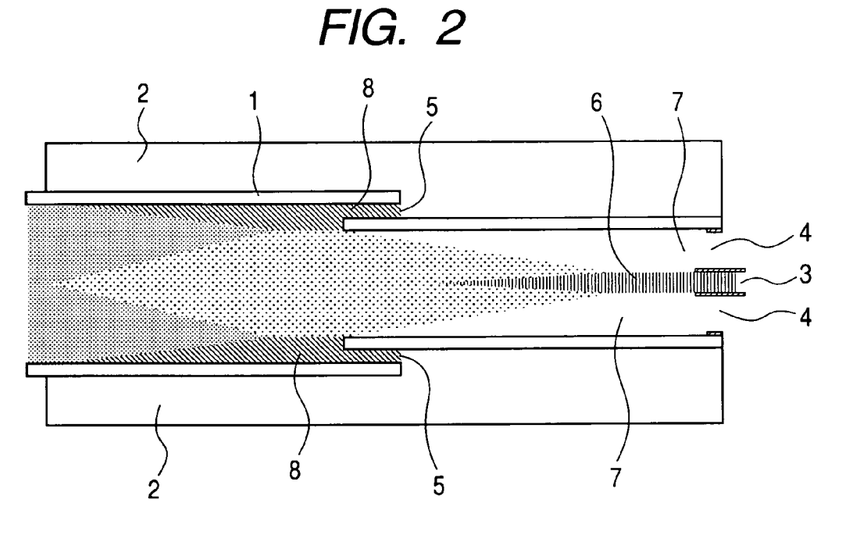
FIG. 2 is a schematic sectional view showing one example of the microreactor capable of being used in the present invention.

The microreactor 1 shown in FIG. 2 introduces the subcritical or supercritical fluid 6 in which the pigment is dissolved from the first fluid inlet 3 into the channel of the microreactor 1 cooled by the external cooling means 2. The coolant 7 is introduced from the second fluid inlet 4 into the microreactor 1. The dispersant solution 8 is introduced from the third fluid inlet 5 into the microreactor 1.

In the microreactor 1 shown in FIG. 2, the third fluid inlet 5 can be brought into contact with two fluids introduced from the first fluid inlet 3 and the second fluid inlet 4 at some midpoint in the microreactor 1. As a result, the fluid in the subcritical or supercritical state in which the pigment dispersed in the coolant is dissolved comes into contact with the dispersant solution, thus making it possible to precipitate and disperse the pigment in the dispersant solution.

The microreactor 1 is suitable for a reaction accompanied by abrupt generation of heat and a reaction requiring rapid cooling because of the efficient heat exchange and the low heat capacity of the fluid. Thus, by externally cooling the channel of the microreactor 1, the fluid flowing through the channel can be temperature-controlled efficiently.

Figure 3:
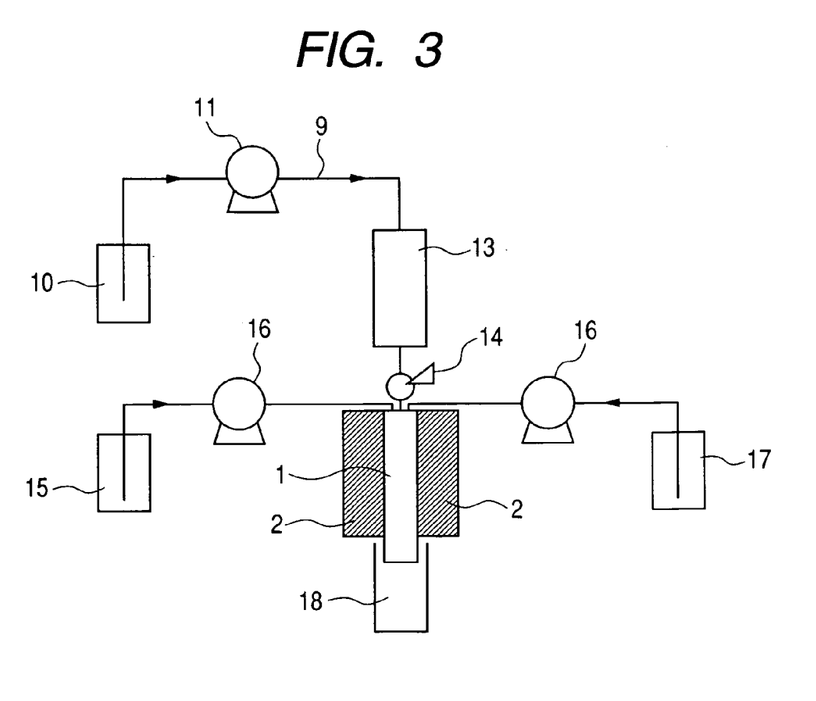
FIG. 3 is a schematic diagram showing one example of a pigment dispersion producing apparatus of the present invention.

FIG. 3 shows one example of the dispersion producing apparatus which is used when the above-mentioned three kinds of fluids are introduced into the microreactor. The apparatus shown in FIG. 3 is different from the apparatus described previously and shown in FIG. 5 in that a coolant tank 15 and the high-pressure pump 16 are provided, and the cooling means 2 is provided around the microreactor 1. In FIGS. 5 and 3, same members are given same symbols, and therefore the apparatus is not described in detail, but it will be briefly described below.

The coolant is introduced from the coolant tank 15 via the high-pressure pump 16 into the second fluid inlet 4 of the microreactor 1, and the dispersant solution is introduced from the dispersant solution yank 17 via the high-pressure pump 16 into the third fluid inlet 5 of the microreactor 1. Here, a backpressure valve may be provided near the outlet of the microreactor 1. In this way, the pressure in the microreactor 1 can be kept at a predetermined pressure by the backpressure valve.

The fluid in the subcritical or supercritical state which is introduced from the first fluid inlet 3 of the microreactor 1 and in which the pigment is dissolved comes into contact with the coolant introduced from the second fluid inlet 4 provided outside the first fluid inlet 3 in the microreactor. The solvent having the dissolved pigment is diffused into the coolant, the resultant mixture is cooled by the cooling means in the microreactor 1, and the pigment is precipitated. The precipitated pigment is dispersed in a dispersion fed from the third fluid inlet 5 provided outside the second fluid inlet 4 to produce a pigment dispersion having the pigment dispersed therein.

The fluid inlet for introducing a solution into one channel forming the microreactor is formed at one end of the channel, for example, concentrically. In the microreactor described previously, the channel width is very small, and therefore the subcritical or supercritical fluid in which the pigment is dissolved, the coolant and the dispersant solution do not form a turbulent flow but form substantially a laminar flow.

The fluid inlet may be arranged in a form other than a concentric form as long as it is arranged so that the subcritical or supercritical fluid in which the pigment is dissolved, the coolant and the dispersant solution form a laminar flow in this order.

The subcritical or supercritical fluid of which the temperature is high at the interface of the laminar flow may be cooled by the coolant and external cooling means. By cooling the fluid, the pigment dissolved in the subcritical or supercritical fluid can be precipitated quickly.

Since the precipitation of the pigment from the solution and the dispersion of the pigment occur in orderly sequence as the subcritical or supercritical fluid is dispersed from the center of the channel to the outer periphery, and they occur in the subcritical or supercritical fluid, the precipitated pigment is very small and uniform in particle diameter. The pigment which is very small and uniform in particle diameter is dispersed in the dispersant solution, whereby a pigment dispersant uniformly dispersing particles having small particle diameters and having dispersion stability over a long period.

The fluid in the subcritical or supercritical state in which the pigment is dissolved, the coolant and the dispersant solution form a laminar flow in the microreactor, but this laminar flow is preferably a laminar flow formed by the subcritical or supercritical fluid, the coolant and the dispersant solution in this order in the normal line direction along the channel.

A block copolymer is preferably contained in the dispersant solution, and the block copolymer is more preferably amphipathic.

The microreactor 1 is suitable for a reaction accompanied by abrupt generation of heat and a reaction requiring rapid cooling because of the efficient heat exchange and the low heat capacity of the fluid. Thus, by externally cooling the channel of the microreactor 1, the fluid flowing through the channel can be temperature-controlled efficiently.

The channel of the microreactor 1 for use in the present invention is on a microscale such that the channel width is several tens to several hundreds to several thousands of μm, and since the size is thus small and the flow rate of the fluid flowing through the channel is low, the Reynolds' number is small. The Reynolds' number mentioned here is a ratio between the inertia force and the viscose force, and is generally an indicator for use in distinguishing between the laminar flow and the turbulent flow. Generally, an instable laminar flow is created if the Reynolds' number exceeds 1000, and a flow called a turbulent flow is created if the Reynolds' number exceeds 2000.

Therefore, the fluid flowing through the microscale channel is not under predominance of the turbulent flow as in a general reaction apparatus, but under predominance of the laminar flow. The "predominant of the laminar flow" does not mean that the flow is fully a laminar flow, but means that the flow is normally a laminar flow, but even if the laminar flow is partially disturbed, fluids in contact at a disorderly boundary do not fully mingle together like the turbulent flow, and thus the laminar flow state is maintained. It is a state which may be called a substantially laminar flow.

Under predominance of the laminar flow, diffusion through the interface is predominant even if flows of fluids are brought in contact. It is the that the microscale space is very advantageous for diffusive mixing at the interface at which laminar flows of fluids come into contact because the surface area per unit volume is large. According to the Fick law, the time required for mixing is proportional to the square of the diffusion distance. Therefore, in mixing by diffusion of molecules, the mixing time becomes shorter as the channel width is reduced. Specifically, if the channel width decreases by a factor of 10, the mixing time decreases by a factor of 100. Thus, the channel width is 10000 μm or less, preferably 1000 μm or less, more preferably 500 μm or less. The smaller the width of each channel, the shorter channel length is required. That is, the diffusion distance decreases as the channel width decreases according to the Fick law, and therefore the channel length required for mixing decreases.

In the present invention, the fluid is distributed in a laminar flow through the channel, an open interface is formed between mutually adjacent fluids, and precipitation and dispersion occur on a step-by-step basis due to diffusion and movement. In the microscale space, molecule transportation, reaction and separation are quickly performed only by the spontaneous behavior of molecules without using mechanical agitation or the like. Thus, it is the that in the reaction under the laminar flow in the microreactor, the reaction speed is generally enhanced compared with the reaction under the turbulent flow where a macro reaction apparatus is used as previously.

Further, mutually adjacent fluids always come into contact in the same timing to form a laminar flow so that the mixing or reaction proceeds, whereby the orderliness of uniform mixing and reaction can be maintained. Therefore, if a step of cooling the subcritical or supercritical fluid in which the pigment is dissolved and precipitating the pigment is carried out in the microreactor, the fluid is cooled instantaneously to produce a large number of nuclei, and based thereon, a large number of pigments grow, and therefore a pigment having a small primary particle diameter is formed. The particle size distribution can be narrowed because of the orderliness of the reaction.

Dispersion occurring in the microreactor allows uniform dispersion. As shown in FIGS. 6A and 6B, the fluid 6 in which the pigment is dissolved in the normal line direction along the flow of the fluid, and the dispersant solution 8 are introduced in this order, whereby the precipitated pigment is dispersed by the dispersant solution.

If a laminar flow is formed by the subcritical or supercritical fluid 6 and the dispersant solution 8 in the microreactor 1, the dispersant solution functions as a carrier fluid near the wall of the channel of the microreactor 1. In this way, deposition of the precipitated pigment on the wall can be avoided, thus making it possible to prevent plugging.

Further, as shown in FIGS. 1A, 1B and 2, the fluid in which the pigment is dissolved is introduced from the first fluid inlet 3, the coolant is introduced from the second fluid inlet 4 and the dispersant solution is introduced from the third fluid inlet 5 to form a laminar flow in the order of the fluid 6, the coolant 7 and the dispersant solution 8 in the normal line direction along the direction of distribution. In this case, the high-temperature fluid 6 does not directly touch the dispersant solution. The subcritical or supercritical fluid comes into contact with the dispersant solution after being cooled by the coolant, and therefore a dispersant which is easily thermally cracked can be used, thus improving the selectivity of the dispersant. The dispersant solution functions as a carrier fluid near the wall of the channel of the microreactor 1, and deposition of the precipitated pigment on the wall can be avoided, thus making it possible to prevent plugging.

Figure 4:
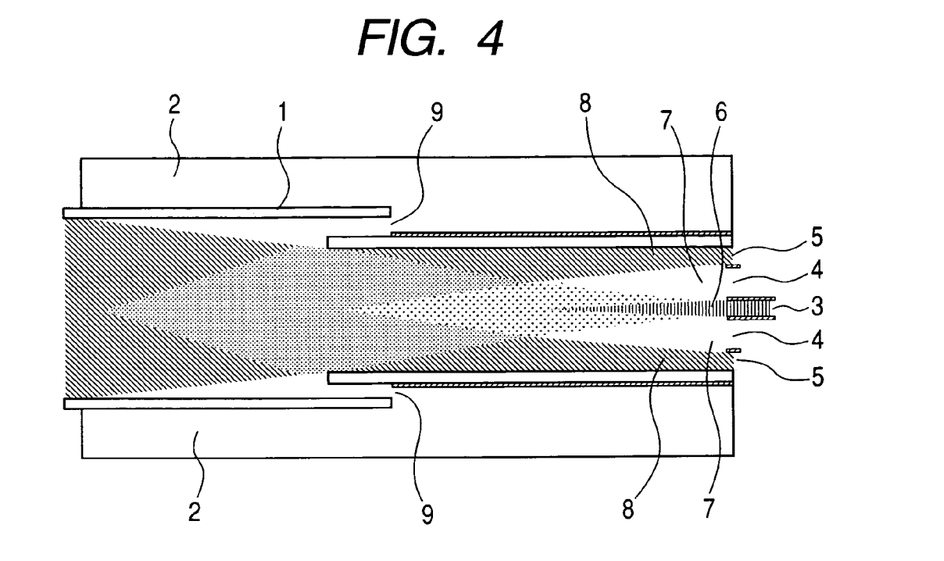
FIG. 4 is a schematic sectional view showing one example of the microreactor capable of being used in the present invention.

As shown in FIG. 4, a fourth fluid inlet 9 is provided, and various additives, assistants and the like may be added as required. As additives and assistants, for example, a pH regulator, a mildew proofing agent, a chelating agent, an anti-foam agent, an antioxidant agent, a viscosity regulator, an electrical conducting agent, an ultraviolet light absorber and a colorant may be introduced from the fourth fluid inlet.

These fluid inlets may be formed in the same plane as in FIGS. 1A and 1B, but may be deformed in various ways with consideration given to the nature of the introduced solution. For example, the dispersant solution may be introduced at some midpoint in the microreactor as in FIG. 2, or the additive and assistant and the like may be introduced at some midpoint in the microreactor as shown in FIG. 4.

By designing the channel and the fluid inlet so that fluids flowing through the channel of the microreactor 1 each form a laminar flow, and an interface is formed between adjacent fluids of the fluids flowing the channel. Diffusion and movement occur via the interface to carry out the mixing and reaction. The effective diameter of the channel of the present invention is 10000 µm or less, preferably 1000 µm or less, more preferably 500 µm or less.

Examples of materials for use as the channel of the microreactor 1 of the present invention include metals, glass, silicon, Teflon and ceramics as materials suitable in terms of the heat resistance, the pressure resistance and the solvent resistance, but preferable are metals. Examples of metals include stainless, hastelloy (Ni—Fe alloy) nickel, gold, platinum, tantalum and the like, but the metal material of the channel of the microreactor 1 used in the present invention is not limited to these metals. The channel surface may be subjected to lining processing for ensuring corrosion resistance of the channel and desired surface energy.

In the present invention, substances generally well known as supercritical fluids, i.e. water, carbon dioxide, ammonia, alcohols such as acetone, methanol and ethanol, and hydrocarbons such as ethane, ethylene, propane, propylene, butane, hexane, benzene and toluene, may be employed.

The supercritical state of each substance is obtained under the following conditions. For example, the temperature is 374° C. or greater and the pressure is 22 MPa or greater for water. The temperature is 235° C. or greater and the pressure is 4.7 MPa or greater for acetone. The temperature is 240° C. or greater and the pressure is 7.9 MPa or greater for methanol. The temperature is 243° C. or greater and the pressure is 6.3 MPa or greater for ethanol. The temperature is 31° C. or greater and the pressure is 7.3 MPa or greater for carbon dioxide. Such supercritical fluids are known to dissolve various kinds of substances, but the subcritical or supercritical fluid for use in the present invention is not limited thereto. They may be used alone, or in combination of several kinds. If no acid or alkali solution is used for the subcritical or supercritical fluid, a dispersant having a low acid resistance or alkali resistance can be used, and thus the selectivity of the dispersant is improved.

The type of pigment for use in the present invention is not specifically limited, and a well known pigment may be used. Such pigments include, for example, phthalocyanine pigments such as nonmetal phthalocyanine, copper phthalocyanine, halogenated copper phthalocyanine and titanylphthalocyanine, azo pigments such as insoluble azo pigments, condensed azo pigments, azo lake and chelate azo pigments, quinacridone pigments, isoindolynone pigments, indanthrone pigments, diketopyrrolopyrrole pigments, dioxadine pigments, dioxazine pigments, perylene pigments, perinone pigments, anthraquinone pigments and the like, but pigments capable of being used are not limited thereto.

For the above-mentioned pigments, commercially available pigments may be used, and in black, cyan, magenta and yellow, commercial available pigments will be illustrated below.

Black pigments may include, but are not limited to, Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II and Raven 1190 ULTRA II (manufactured by Colombian Carbon Co., Ltd.), Black Pearls L, MOGUL-L, Regal 400R, Regal 660R, Regal 330R, Monarch 800, Monarch 880, Monarch 900, Monarch 1000, Monarch 1300 and Monarch 1400 (manufactured by Cabot Co., Ltd.), Color Black FW1, Color Black FW2, Color Black FW200, Color Black 18, Color Black S160, Color Black S170, Special Black 4, Special Black 4A, Special Black 6, Printex35, PrintexU, Printex 140U, PrintexV and Printexl40V (manufactured by Degussa Co,. Ltd.), No. 25, No. 33, No. 40, No. 47, No. 52, No. 900, No. 2300, MCF-88, MA600, MA7, MA8 and MA100 (manufactured by Mitsubishi Chemical Corporation)

Cyan pigments include, but are not limited to, C.I. Pigment Blue-1, C.I. Pigment Blue-2, C.I. Pigment Blue-3, C.I. Pigment Blue-15, C.I. Pigment Blue-15:2, C.I. Pigment Blue- 15:3, C.I. Pigment Blue-15:4, C.I. Pigment Blue-16, C.I. Pigment Blue-22 and C.I. Pigment Blue-60.

Magenta pigments include, but are not limited to, C.I. Pigment Red-5, C.I. Pigment Red-7, C.i. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202 and C.I. Pigment Red-207.

Yellow pigments include, but are not limited to, C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

For the coolant for use in the present invention, a combination which is easily mixed with the subcritical or supercritical fluid and the dispersant in the dispersant solution and its solvent is selected. Coolants include water, alcohols such as acetone, methanol and ethanol, hydrocarbons such as hexane, benzene, toluene and xylene, 1-methyl-2-pyrrolidinone, 1,3-dimethyl-2-imidazolidinone, 2-purrolidinone, ε-caprolactam, amides such as formamide, N-methylformamide, N,N-dimethylformamide, acetamide, N-methylacetamide, N,N-dimethylacetamide, N-methylpropaneamide and hexamethylphosphorictriamide, and ethers such as tetrahydrofuran and dioxane, but the coolant for use in the present invention is not limited thereto. These coolants may be used alone or in combination of several kinds.

In the present invention, a block copolymer is used for the dispersant. Dispersion occurs in the microreactor, whereby the orderliness of dispersion is satisfactory and the particle diameter is very easily uniformed. Here, by using an amphipathic block copolymer, the inclusion state is stabilized. In inclusion of particles, a good inclusion state, i.e. good dispersion stability, is shown in that an amphipathic copolymer forming the amphipathic block copolymer has a stable polymer micelle formation capability.

Further, the block copolymer is amphipathic, whereby the selectivity of the solvent of the dispersant solution and the coolant is improved when particles are dispersed with the block copolymer in the microreactor, thus making it possible to select a combination of solvents allowing efficient dispersion.

The block copolymer which is a component for use further characteristically in the present invention will now be described.

For specific examples as block copolymers which can be used in the present invention, previously known block copolymers such as acryl and methacryl block copolymers, addition or condensation type block copolymers of polystyrene and other polymers, block copolymers having blocks of polyoxyethelene, polyoxyalkylene, and the like may be used. In the present invention, the block copolymer has more preferably a block form such as AB, ABA, ABC or the like. A, B and C each represents a different block segment. The block copolymer for use in the present invention is preferably amphipathic.

Specifically, preferred forms include the following copolymers: AB diblock copolymers composed of a hydrophobic segment and a hydrophilic segment having an organic acid or its ionic salt unit. In addition, preferred examples may include ABC triblock copolymers having a hydrophobic segment, a hydrophilic segment having an organic acid or its ionic salt unit and further another segment.

In the case of the ABC triblock, a form in which A is a hydrophobic segment, B is a nonionic hydrophilic segment and C is a hydrophilic segment having an organic acid or its ionic salt unit is preferable, and it is also preferable in terms of stabilization of the inclusion state.

For example, if the aforethe ABC triblock copolymer is used to prepare a dispersion using a coloring material and water as a solvent, the coloring material can be included in a micelle formed by the ABC block copolymer. A coloring material inclusion type ink composition can also be formed. Particles of the dispersion composition can also be made very uniform in particle diameter. Further, its dispersion state can also be made extremely stable. If these treatments are carried out using a microreactor, particles become very uniform in particle diameter and uniformity is further improved.

In the present invention, an amphipathic block copolymer is used. For example, it can be obtained by selecting a hydrophobic block segment and a hydrophilic block segment from a repeated unit structure of the following formula (1) and synthesizing the selected segments.

<Formula 1>

(1)

(In the formula, $R^1$ is selected from straight chain, branched or cyclic alkyl groups having 1 to 18 carbon atoms, $-(CH(R^2)-CH(R^3)-O)_l-R^4$ and $-(CH_2)_m-(O)_n-R^4$. 1 and m are each independently selected from integer numbers of 1 to 12, and n is 0 or 1. $R^2$ and $R^3$ are each independently H or $CH_3$. $R^4$ is selected from H, straight chain, branched or cyclic alkyl groups having 1 to 6 carbon atoms, Ph, Pyr, Ph-Ph, Ph-Pyr, $-CHO$, $-CH_2CHO$, $-CO-CH=CH_2$, $-CO-C(CH_3)=CH_2$, $CH_2COOR^5$, and if $R^4$ is not a hydrogen atom, the hydrogen atom on the carbon atom may be substituted by a straight chain or branched alkyl group having 1 to 4 carbon atoms or F, Cl or Br, and the carbon atom in the aromatic ring may be substituted by a nitrogen atom. $R^5$ is H or an alkyl group having 1 to 5 carbon atoms.)

In the present invention, -Ph represents a phenyl group, -Pyr represents a pyridine group, -Ph-Ph represents a biphenyl group, and -Ph-Pyr represents a pyridyl phenyl group. The pyridyl group, biphenyl group and pyridyl phenyl group may be any of possible positional isomers.

The molecular weight distribution=Mw (weight average molecular weight)/Mn (number average molecular weight) of the block copolymer for use in the present invention is preferably 2.0 or less, more preferably 1.6 or less, further preferably 1.3 or less, most preferably 1.2 or less.

The number average molecular weight Mn of the block polymer for use in the present invention is preferably in the range of 1000 to 30000. If the number average molecular weight Mn of the block polymer for use in the present invention is in the range of 1000 to 300000, a substance performing a predetermined function can be satisfactorily dispersed in a solvent.

For improvement of dispersion stability and improvement of an inclusion characteristic, the molecular mobility of the block copolymer is preferably more flexible in that the block copolymer is physically entangled and becomes more compatible with the particle surface. Further, the molecular mobility is preferably flexible in that a coating layer is easily formed on a recorded medium as described in detail later. It is preferably flexible in that a coating layer of the block copolymer is easily formed on a recorded medium especially if the pigment is used as an ink.

The coating layer of the block copolymer can inhibit oxidation and optical degradation of the included coloring material to improve an environment resistance. For this purpose, the glass transition temperature Tg of the main chain of the block polymer is preferably 20° C. or less, more preferably 0° C. or less, further preferably −20° C. or less. In this respect, a polymer having a polyvinyl ether structure is suitably used because it has a low glass transition temperature and a characteristic of flexibility. This is because owing to flexibility of the molecular mobility of the block polymer, the block polymer is physically entangled and more compatible with the surface of a functional substance.

It is preferable that an aromatic structure, preferably a structure such as phenyl or phenylene is used for the hydrophobic segment. For stabilization of the inclusion state, the polymeric, i.e. hydrophobic segment portion of the core part preferably has a predefined or greater molecular weight. Specifically, the molecular weight is 7000 or greater, preferably 10000 or greater, more preferably 12000 or greater as a number average molecular weight.

Because the block copolymer is thus amphipathic, dispersion occurs for both aqueous and oily solvents. This improves the selectivity of the solvent of the dispersant solution and the coolant when particles are dispersed by the block copolymer in the microreactor, thus making it possible to select a combination of solvents allowing efficient dispersion.

Solvents of the dispersant solution of the present invention include water, alcohols such as acetone, methanol and ethanol, hydrocarbons such as hexane, benzene, toluene and xylene, 1-methyl-2-pyrrolidinone, 1,3-dimethyl-2-imidazolidinone, 2-purrolidinone, ε-caprolactam, amides such as formamide, N-methylformamide, N,N-dimethylformamide, acetamide, N-methylacetamide, N,N-dimethylacetamide, N-methylpropaneamide and hexamethylphosphorictriamide, and ethers such as tetrahydrofuran and dioxane, but the solvent of the dispersant solution for use in the present invention is not limited thereto. These solvents of the dispersant solution may be used alone or in combination of several kinds.

EXAMPLES

The present invention will be described in detail with examples below, but the present invention is not limited to these examples.

First Example

Using the apparatus shown in FIG. 3, 0.5 g of copper phthalocyanine was put in the sub/supercritical reaction vessel 13, and water was fed from the solvent tank 10 into the sub/supercritical reaction vessel 13 at a flow rate of 5 ml/min. The interior of the sub/supercritical reaction vessel was brought into a supercritical state of 25 MPa and 400° C. to prepare a supercritical fluid.

In this example, the microreactor 1 shown in FIG. 4 was used.

Water was used as a coolant. The coolant was put in the coolant tank 15, and fed into the microreactor 1 using the high-pressure pump 16. For the dispersant, a block copolymer was used. Specifically, 2-(4-methylphenyl)ethylvinylether was used for A segment, 2-(2-methoxyethyloxy) ethylvinylether was used for B segment, and 4-(2-vinyloxy) ethoxy ethyl benzoate was used for C segment. This was used to obtain a triblock copolymer of which the copolymerization molar ratio A/B/C was 90/80/14. 6 parts by weight of the triblock copolymer were dissolved in 47 parts of N,N-dimethylformamide and the resultant solution was used as a dispersant solution. The dispersant was put in the dispersant solution tank 17, and fed into the microreactor 1 using the high-pressure pump 16.

The microreactor 1 was made of stainless, had an inner diameter of 3 mm and a length of 300 mm, used a cryocompressor as cooling means 2, and was set at 20° C. The first fluid inlet 3, the second fluid inlet 4, the third fluid inlet 5 and the fourth fluid inlet 9 were formed concentrically, and their channel widths were 250 μm, 800 μm, 500 μm and 500 μm, respectively. The flow rate of the supercritical fluid which was introduced from the first fluid inlet and in which a pigment was dissolved was 5 ml/min. The flow rate of the coolant introduced from the second fluid inlet was 20 ml/min. The flow rate of the dispersant solution introduced from the third fluid inlet was 10 ml/min, and the dispersant solution introduced from the fourth fluid inlet 9 was introduced into the microreactor 1 at a flow rate of an aqueous potassium hydroxide solution.

The fluids introduced from the fluid inlets of the microreactor 1 cooled using the cooling means 2 formed a laminar flow shown in FIG. 4 and were mixed uniformly. The particle diameters of dispersion particles thus obtained were measured using Dynamic Light Scattering Meter DLS 7000 manufactured by Otsuka Electronics Co., Ltd., and resultantly it was found that the particle diameters were very uniform and the average particle diameter was 80 nm. The particle diameter ranged from 70 to 100 nm, and the particle diameter distribution was thus narrow. The dispersion degree index was 0.098. As a result of leaving the dispersion standing at room temperature, and observing coagulation/sedimentation of particles, no sedimentation occurred even after standing for a month, and its dispersion stability was confirmed. When this pigment dispersion was used as an ink for inkjet, filled in an ink tank of BJ Printer S530 (manufactured by Canon Inc.) and recorded on a normal paper, letters could be printed clearly, and the light resistance was improved.

Comparative Example 1

No dispersant solution was used, a pigment was precipitated in the same manner as in example 1, and the obtained pigment particles were dispersed in a beaker instead of being dispersed in the microreactor. Dispersion processing was carried out by a mechanical stirrer using the dispersant solution used in Example 1 to produce a pigment dispersant. The pigment in the obtained pigment dispersant had an average particle diameter of 150 nm, the particle diameter ranged from 120 to 180 nm. The dispersion degree index was 0.253, and sedimentation was observed after standing for a month.

Second Example

A copolymer using as a dispersant 2-(4-methylphenyl) ethylvinylether for A segment, 2-(2-methoxyethyloxy) ethylvinylether for B segment and 4-(2-vinyloxy) ethoxy ethyl benzoate for C segment. Specifically, a dispersion was produced in the same manner as in the first example except that a triblock copolymer of which the copolymerization molar ratio A/B/C was 90/80/14 was used, and tetrahydrofuran was used for the coolant and the dispersant solvent. In this way, results similar to those of the first example were obtained for both the average particle diameter and dispersion stability.

Third Example

A dispersion was produced in the same manner as in the first example except that a fluid in a subcritical state of 25 MPa and 250° C. was used. As a result, results similar to those of the first example were obtained for both the average particle diameter and dispersion stability.

Fourth Example

A dispersion was produced in the same manner as in the first example except that a back pressure valve was provided at the outlet of the microreactor 1, and results similar to those of the first example were obtained for both the average particle diameter and dispersion stability.

Fifth Example

Using the apparatus shown in FIG. 5, 0.5 g of dimethyl quinacridone was put in the sub/supercritical reaction vessel 13, and water was fed from the solvent tank 10 into the sub/supercritical reaction vessel 13 at a flow rate of 5 ml/min. The interior of the sub/supercritical reaction vessel was brought into a supercritical state of 25 MPa and 400° C. to prepare a supercritical fluid.

In this example, the microreactor 1 shown in FIGS. 6A and 6B was used.

For the dispersant, 6 parts by weight of sodium lauryl sulfate were dissolved in 40 parts of water, and the resultant solution was used as a dispersant solution. The dispersant was put in the dispersant solution tank 17, and fed into the microreactor 1 using the high-pressure pump 16.

The microreactor 1 was made of stainless, and had an inner diameter of 3 mm and a length of 300 mm. The first fluid inlet 3 and the second fluid inlet 4 were formed concentrically, and the channel widths of the fluid inlets were 250 μm and 800 μm, respectively. The supercritical fluid which was introduced from the first fluid inlet and in which a pigment was dissolved was introduced into the microreactor 1 at a flow rate of 5 ml/min, and the dispersant solution introduced from the second fluid inlet was introduced into the microreactor 1 at a flow rate of 10 ml/min.

The fluids introduced from the fluid inlets of the microreactor 1 cooled using the cooling means 2 formed a laminar flow shown in FIG. 6A and were mixed uniformly. The particle diameters of dispersion particles thus obtained were measured using Dynamic Light Scattering Meter DLS 7000 manufactured by Otsuka Electronics Co., Ltd., and resultantly it was found that the particle diameters were very uniform and the average particle diameter was 50 nm. The particle diameter ranged from 40 to 65 nm, and the particle diameter distribution was thus narrow, and the dispersion degree index was 0.097. As a result of leaving the dispersion standing at room temperature, and observing coagulation/sedimentation of particles, no sedimentation occurred even after standing for a month, and its dispersion stability was confirmed. When this pigment dispersion was used as an ink for inkjet, filled in an ink tank of BJ Printer S530 (manufactured by Canon Inc.) and recorded on a normal paper, letters could be printed clearly, and the light resistance was improved.

This application claims priority from Japanese Patent Application No. 2004-316151 filed Oct. 29, 2004, which is hereby incorporated by reference herein.

What is claimed is:

1. A method for producing a pigment dispersion, comprising the steps of:
   preparing a first fluid in a supercritical or subcritical state in which a pigment is dissolved;
   preparing a second fluid containing a dispersant for dispersing the pigment in a dispersing medium;
   introducing the first fluid and the second fluid into a microreactor to contact these fluids to form a laminar flow; and
   transporting the contacted fluids in the microreactor to precipitate the pigment and to disperse the pigment with the dispersant in the dispersing medium.

2. The method for producing a pigment dispersion according to claim 1, wherein a coolant is introduced into the microreactor.

3. The method for producing a pigment dispersion according to claim 2, wherein the first fluid is brought into contact with the coolant in a channel comprising the microreactor, and then these fluids are brought into contact with the second fluid.

4. The method for producing a pigment dispersion according to claim 3, wherein the pigment is precipitated by the contact between the first fluid and the coolant, and the precipitated pigment is brought into contact with the second fluid.

5. The method for producing a pigment dispersion according to claim 4, wherein at an interface between the first fluid and the coolant, the first fluid is diffused into the coolant to precipitate the pigment from the first fluid.

6. The method for producing a pigment dispersion according to claim 4, wherein the precipitated pigment is dispersed in the second fluid at an interface between the second fluid and the coolant.

7. The method for producing a pigment dispersion according to claim 3, wherein the first fluid, the coolant and the second fluid, which come into contact in a channel comprising the microreactor, form a laminar flow.

8. The method for producing a pigment dispersion according to claim 3, wherein the microreactor has a plurality of channels placed concentrically in such a manner as to surround a first channel, the first fluid is introduced from the first channel, the coolant is introduced from a channel provided to be adjacent to the first channel, and the second fluid is introduced from an outer channel.

9. The method for producing a pigment dispersion according to claim 2, wherein the coolant is water.

10. The method for producing a pigment dispersion according to claim 1, wherein the dispersant is a block copolymer.

11. The method for producing a pigment dispersion according to claim 10, wherein the block copolymer is amphipathic.

* * * * *